United States Patent [19]

Labadie

[11] 4,319,897
[45] Mar. 16, 1982

[54] AIR FILTER ASSEMBLY INCLUDING AN IMPROVED JET PUMP CLEANING APPARATUS

[75] Inventor: Paul A. Labadie, Redondo Beach, Calif.

[73] Assignee: Farr Company, El Segundo, Calif.

[21] Appl. No.: 159,761

[22] Filed: Jun. 16, 1980

[51] Int. Cl.³ .................. B01D 46/04; F04F 5/46
[52] U.S. Cl. ................................ 55/302; 55/468; 417/198
[58] Field of Search ............. 55/293, 302, 468; 417/198, 151

[56] References Cited

U.S. PATENT DOCUMENTS

| | | | |
|---|---|---|---|
| 3,535,852 | 10/1970 | Hirs | 55/302 |
| 3,963,467 | 6/1976 | Rolshau | 55/293 |
| 4,007,026 | 2/1977 | Groh | 55/302 |
| 4,149,828 | 4/1979 | Affri | 417/198 |

FOREIGN PATENT DOCUMENTS 17895 10/1902 Sweden ........................... 417/198

Primary Examiner—David L. Lacey
Attorney, Agent, or Firm—Lyon & Lyon

[57] ABSTRACT

Disclosed herein is a jet pump including an air nozzle and an ejector tube which is mounted above the open clean air end of a cylindrical pleated paper filter element in an aspirated air filter assembly for use in back pulsing air through the interior of the filter element for removing dust therefrom. The ejector tube is of a cylindrical constant radius configuration having a flared open upper end. As a jet of air is back pulsed through the flared upper end of the ejector tube, the configuration of the tube causes the surrounding air to be entrained and accelerated downwardly into the tube where it is diffused and directed into the interior of the filter element, blowing the dust off the cylindrical wall thereof.

8 Claims, 3 Drawing Figures

AIR FILTER ASSEMBLY INCLUDING AN IMPROVED JET PUMP CLEANING APPARATUS

BACKGROUND OF THE INVENTION

The present invention relates to a jet pump including a nozzle and an ejector tube for use in back pulsing a cylindrical pleated paper filter element in a filter assembly to blow the dust off the cylindrical wall of the element and thereby provide continuous cleaning of the filter element. The filter assembly for which this ejector tube was particularly designed is similar in its general operation to that described in British Pat. No. 1,516,721 which, in turn, is quite similar in operation to the bag house filter assemblies which have been known for many years.

The more recent filter assemblies of this type comprise a large housing which is partitioned into a lower dirty air portion and an upper clean air portion. A plurality of rows of cylindrical pleated filter elements are removably mounted in the lower portion of the housing such that the open upper end of the filter elements are in sealing engagement with the partition between the upper and lower portions of the housing. Apertures are provided in the partition in axial alignment with the open end of the secured filter element communicating the interiors of the filter elements with the upper clean air portion of the housing. Dust laden air is directed into the lower portion of the housing where it passes through the walls of the filter element, depositing its dust, and upwardly through the interior of the filter element into the clean air portion of the housing. The air is then exhausted through an air outlet whereupon the exiting clean air can be recirculated for ventilation, directed to the air intake of a large gas turbine or used for any number of purposes.

To prevent the individual filter elements in such an assembly from becoming overladen with dust particles, each filter element is repeatedly cleaned by back pulsing a jet of air downwardly through the interior of the filter element opposite to the direction of general air flow. This back pulsing forces the dust particles which have accumulated on the filter elements outwardly therefrom whereupon they fall to the bottom of the lower portion of the filter housing where they can be accumulated in a hopper for disposition.

In back pulsing the paper pleated filter elements of the type used in such filter assemblies, which are more fully described later herein, it is necessary to pump a relatively large volume of air in a quick pulse through the filter element to remove the dust which has collected between the narrowly spaced pleats of the filter media. While the continuous air flow through the filter assembly may be on the nature of 400-500 cubic feet per minute, to be effective, this back pulse which is only about 0.5 seconds in duration, should be at least 1250 cubic feet per minute against a head of approximately 10 inches of water. Accordingly, it has been necessary to develop a suitable jet pump capable of providing such a high volume and velocity back pulse to adequately clean these pleated paper filter elements.

The jet pump which has heretofore been used on such filter assemblies are essentially the same as those used in the conventional reverse pulse "bag house" filter assemblies. These pumps comprise a venturi tube mounted above the cylindrical filter element. To clean the filter bag in the bag filter assemblies, a short burst of compressed air was directed into the outlet end of the venturi tube. This momentary jet of high velocity high entrained and forced secondary air into the bag which caused it to inflate and then snap onto its wire cage support. This change in shape and snap action of the bag dislodged the accumulated dust and filter. However, when used with the more rigid pleated paper filter element which do not undergo this change of shape during cleaning, it has been found that the venturi tubes are too inefficient to properly blow the collected dust from the narrowly spaced pleats in the filter element. Accordingly, in order to obtain the full benefit of the improved efficiency of the cylindrical pleated paper filter elements in a back pulsing filter assembly, it is necessary to develop a more efficient jet pump. The ejector tube described herein provides such a pump.

SUMMARY OF THE INVENTION

Briefly, the present invention relates to an improved jet pump for use in back pulsing a cylindrical pleated paper filter element to remove all of the dust therefrom. The jet pump comprises a constant radius cylindrical tube which is mounted over the open upper end of a cylindrical filter element and has a flared upper end. As a jet of air is back pulsed through the flared end of the tube, the surrounding air is entrained and accelerated downwardly into the tube where it is diffused, converting a portion of the dynamic head of the mixed air into a static head for blowing the dust outwardly from the walls of the pleated filter element.

It is the principal object of the present invention to provide a jet pump for cleaning a cylindrical pleated filter element by back pulsing the filter element which is more efficient than those pumps heretofore available.

It is another object of the present invention to provide an economical jet pump for cleaning a cylindrical pleated filter element by back pulsing the filter element which has improved entrainment and diffusion characteristics to provide a higher volumetric air flow rate than that generated by pumps heretofore available.

It is a still further object of the present invention to provide a jet pump for cleaning a cylindrical pleated filter element by back pulsing the filter element which is of simple construction and economical to manufacture.

These and other objects and advantages of the present invention will become apparent from the following detailed description taken in conjunction with the accompanying drawings.

IN THE DRAWINGS

DESCRIPTION OF THE PREFERRED EMBODIMENT

Figure 1:
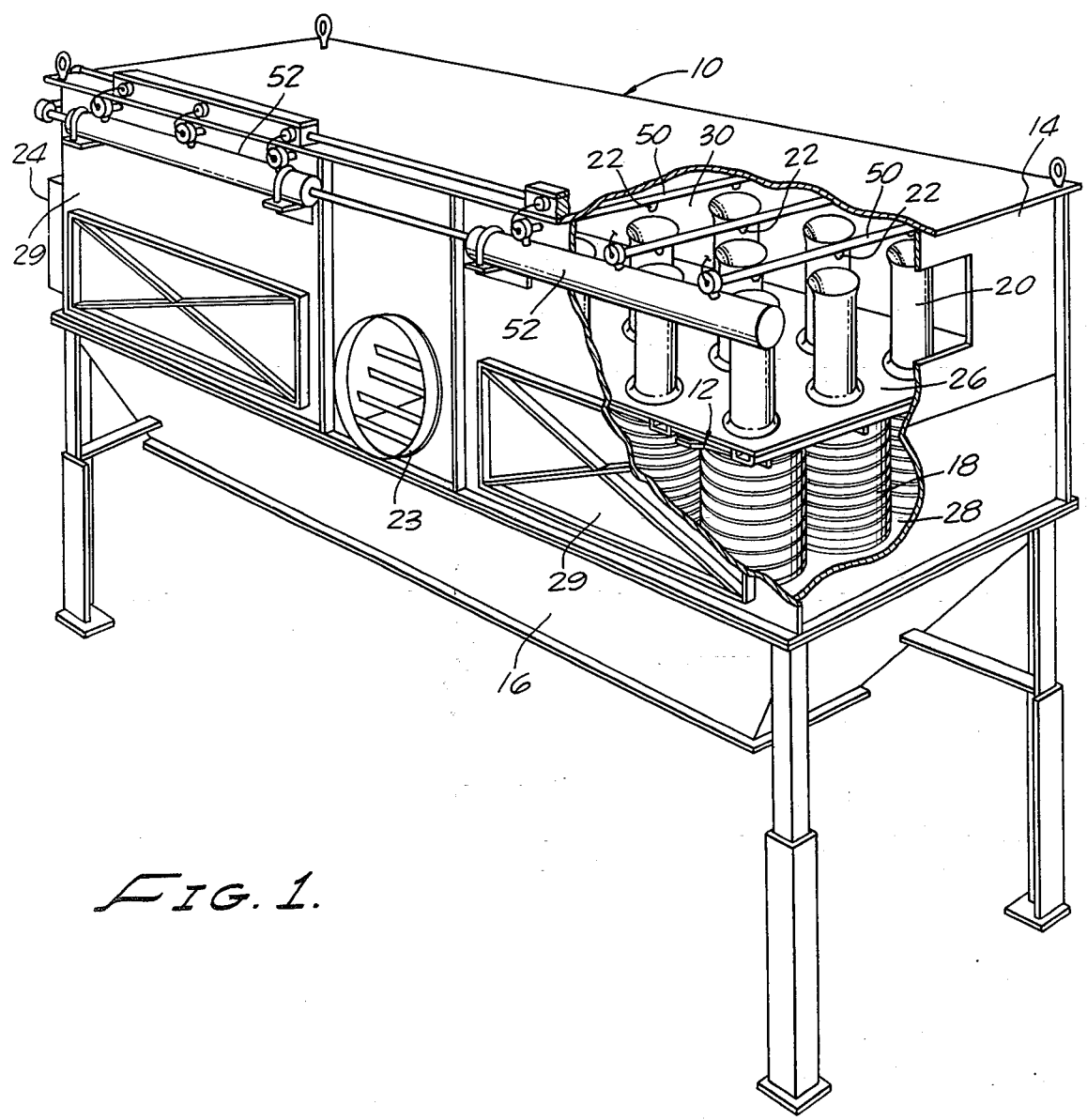
FIG. 1 is a partial sectional view of a filter assembly employing the present invention.

Referring now in detail to the drawings, a filter assembly 10 of the type for which the ejector tube jet pump 20 of the present invention was developed, is illustrated in FIG. 1. As seen therein, the filter assembly is comprised of a large housing 14, a lower hopper 16 for collecting the filtered dust or other foreign matter, a plurality of cylindrical pleated filter elements 18, a corresponding plurality of the ejector tubes 20 and back pulsing nozzles 22. The filter housing 14 has a lower air inlet 23, an upper air outlet 24 and the interior thereof is partitioned by horizontal diaphragm plate 26 into a lower dirty air chamber 28 and upper clean air chamber 30. The filter assembly has doors 29 therein providing access to the lower chamber 28 and the filer elements 18 mounted therein. The lower chamber 28 is opened at its lower end so that foreign matter filtered from the air can fall freely into the hopper 16. The lower chamber communicates with the upper chamber through a plurality of apertures 32 (see FIG. 2) in the diaphragm plate 26.

The filter elements 18 are removably mounted within the lower chamber 28 and held against the diaphragm plate 26 by a locking mechanism 12 such that they depend from the diaphragm plate. Each element is comprised of pleated paper filter media 34 which is formed into a cylindrical configuration to define a hollow interior 35. The media can be supported in this configuration by a helical wrap 36 around the outer surface of the media with twine which has been precoated with a suitable adhesive. Of course, other means of supporting the pleated filter media could also be employed. The lower ends of the filter elements are sealed by end plates 40 and a mounting plate 42 is secured about the open upper ends of the filter elements. A suitable gasket 46 is secured to the mounting plate about the open upper end of the filter elements for effectuating an air tight seal with the diaphragm plate 26 when the filter element is pressed there-against by the locking mechanism 12.

A plurality of ejector tubes 20 of the present invention are secured to the diaphragm plate 26 directly above the apertures 32 therein so that air passing through the pleated walls of the filter elements 18 flows upwardly through the interior of the filter element, through the apertures 32 in the diaphragm plate, through the ejector tubes and into the clean air chamber or plenum 30. Disposed directly above the open ends of the ejector tubes are a plurality of air nozzles 22. These nozzles depend from flow pipes 50 which are in fluid communication through manifolds 52 with a source of air pressurized at about 70 psig.

In operation, dust laden air is forced into the lower chamber 28 of the filter housing 14 where it is directed by baffles or other suitable manifold means (not shown) to the cylindrical filter elements 18. As the air passes through the pleated filtered media and into the interior of the filter elements, the dust and other foreign matters carried thereby is filtered from the air flow. The clean air passes upwardly through the ejector tubes into the upper clean air chamber 30 and exits the filter housing through the clean air outlet 24.

Figure 2:
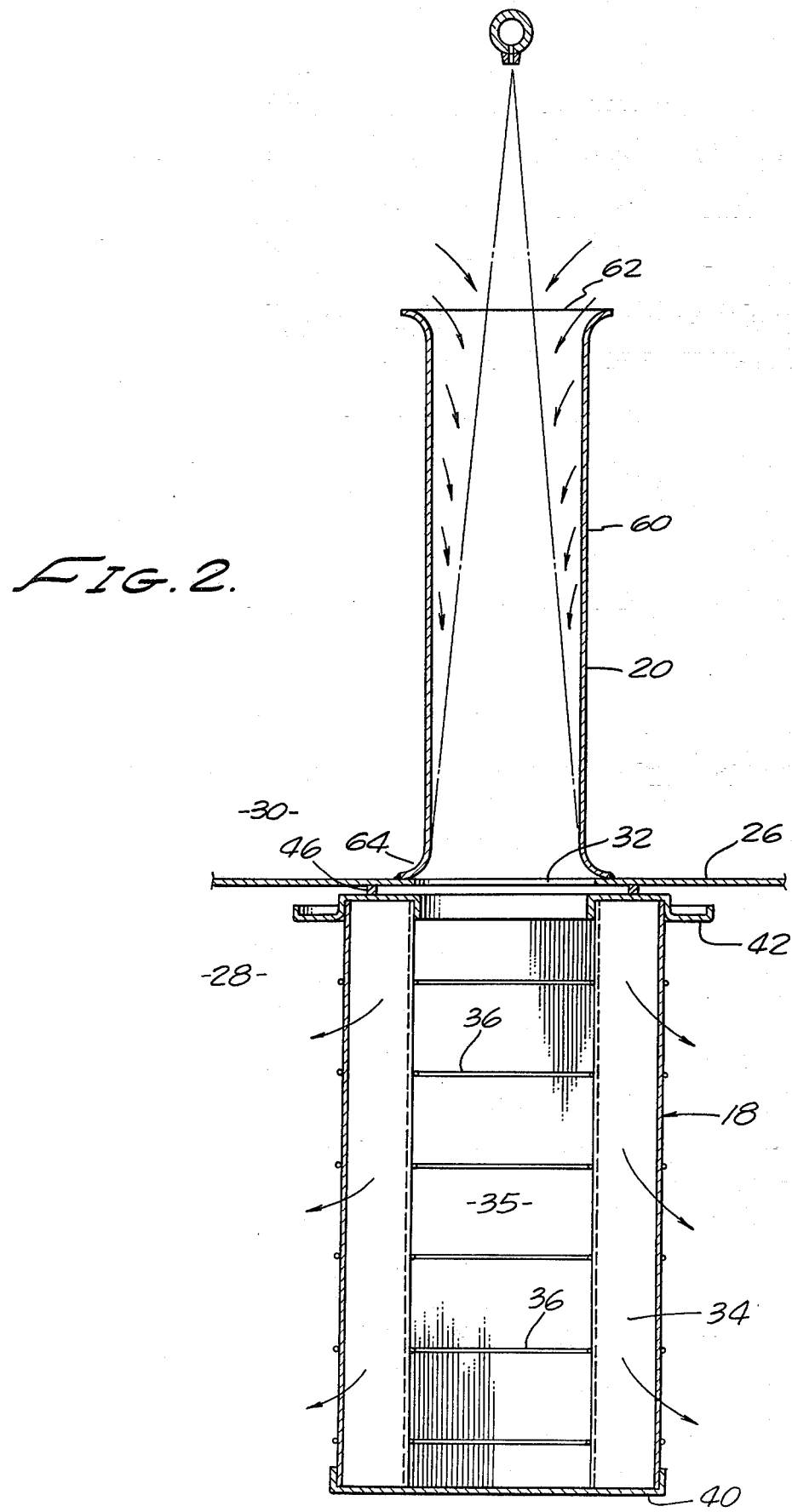
FIG. 2 is an enlarged sectional view of an ejector tube of the present invention shown mounted over a filter element and illustrating the air flow therethrough during back pulsing.

To remove the accumulated foreign matter from the walls of the filter elements 18, pulses or jets of pressurized air are periodically emitted from the nozzles 22 down the ejector tubes and into the interior of the filter elements 18. However, to effectively clean the filter elements it is necessary to provide a jet pump which can deliver a considerably larger volume of air into the interior of the filter element as compared to the volume of primary air emitted from a nozzle 22. It has been found that a back pulse of about 1250 cfm against a head of about 10 inches w.g. provides excellent cleaning of the filter elements. This velocity of air flow can be obtained with the ejector tubes of the present invention by periodic emission of primary air pulses of about 0.5 cubic feet of air for a duration of about 5 seconds which is a primary pulse rate of only about 60 cubic feet per minute. The entrainment of the surrounding or secondary air is illustrated in FIG. 2. This secondary air is accelerated into the ejector tubes at the expense of the velocity of the primary air. Within the constant radius or diffuser portion of the ejector tubes, the primary and secondary air diffuse and a portion of the dynamic head of the mixture is converted into a static pressure head which blows the dust from the walls of the filter element. It is the particular configuration of the ejector tube 20 which develops such a static pressure head and high volume air flow into the filter element for cleaning from such a short burst of primary air.

The configuration of the ejector tube is best seen in FIG. 2. As seen therein, the tube 12 is comprised of a constant radius cylindrical sidewall portion 60, an upper bell-mouth opening 62 and a similarly configured lower bell-mouth opening 64. In the presently preferred embodiment of the ejector tubes 12, each tube has a height of about 21 inches, the substantially vertical constant radius cylindrical sidewall portion 60 defines a tube diameter (D) of about 6 inches which flares outwardly at its open bell-mouth ends 62 and 64 along a radius of 1.8 inches to define an open upper end diameter of about 8 inches. This configuration defines a length to diameter ratio of 3.5. It has been found that to provide sufficient entrainment of secondary air and diffusion of the primary and secondary air, a minimum length to diameter of 3 is preferred with the optimum being approximately 3.5 to 4. When the diameter of the ejector tubes are varied, the radius defining the upper and lower bell-mouth, which is important in that it substantially affects the ejector tubes performance, is also changed. It has been found that the radius defining the bell-mouths should be about 0.3D. This configuration of the upper bell-mouth opening 62 in cooperation with the constant radius portion 60 provides this superior secondary air entrainment for cleaning purposes while the same configuration on the lower bell-mouth opening 64 in cooperation with the constant radius portion 60 produces a very low pressure drop across the entire filter assembly as the dust laden air is passing through the filter elements and ejector tubes from the lower dirty air chamber 28 to the upper clean air chamber 30. This pressure drop has been found to be appreciably lower than that experienced with the conventional venturi tubes which have been heretofore utilized as a jet pump on such filter assemblies. Additionally to optimize the performance of the ejector tubes 20, they should be mounted 1.5D below the air nozzles 22, which, with the presently preferred diameter of 6 inches, places the ejector tubes 9 inches below the air nozzles 22.

Figure 3:
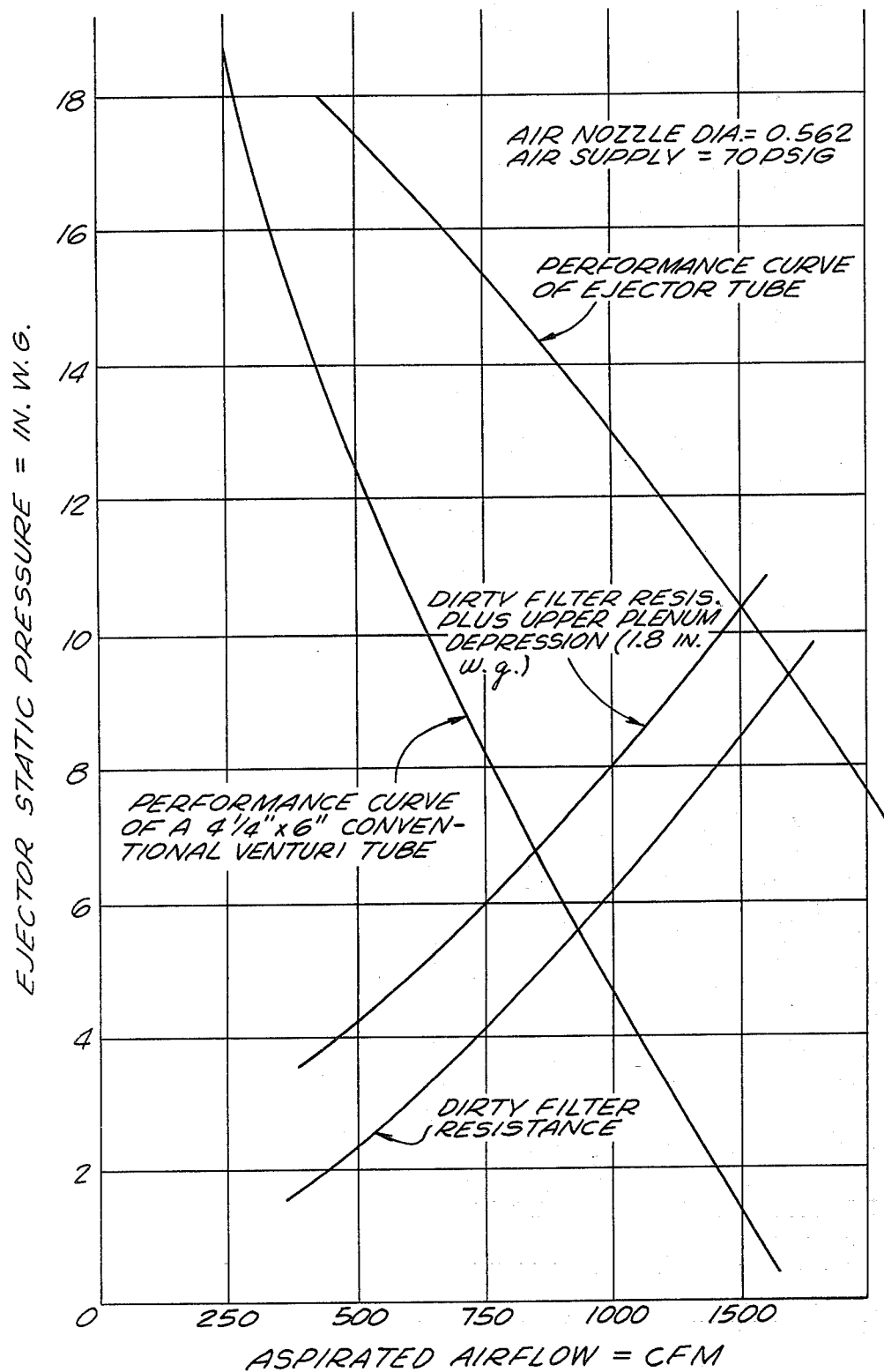
FIG. 3 is a graph illustrating comparative aspirated air flows achieved through the ejector tube of the present invention and the conventional venturi tube jet pump.

The superior performance of entrainment characteristics of ejector tubes 12 over that exhibited by the conventional venturi tube configuration is illustrated in FIG. 3. To determine the flow rate that those tubes will produce, it is necessary to superimpose the resistance or pressure that the ejector and venturi tubes are pumping against over the performance curves of the two tubes. This pressure is the sum of the pressure difference between that found in the upper air chamber 30 ($P_2$) and that found in the lower air chamber 28 ($P_1$) of the filter assembly, which, is termed the upper plenum depression and by way of example is taken a 1.8 inches w.g., and the resistance of the dirty filter which, as shown, increases with the flow rate. At the intersection of the upwardly sloping curve representing the resistance against which the two tubes are pumping with the performance curve of the ejector tube and venturi tube, it is seen that the venturi type tube pumped at a flow rate of 850 cubic feet per minute and the ejector tube of the present invention pumps at 1250 cubic feet per minute which represents approximately a 50% improvement. This increase in flow rate provides superior cleaning of the filter element and allows the filter assembly to operate for a substantially longer period of time with a pressure drop of only 1.8 inches w.g. than would be possible with the conventional venturi tube configuration.

It should be noted that while in the embodiment of the filter assembly illustrated in the drawings, two groups of filter elements are employed, with each group having three rows of three filter elements each, any number of filter elements could be employed. In this embodiment, three back pulse nozzles are carried by each of the 6 blow pipe tubes 50 and all 3 nozzles are activated concurrently. After a period of about 5 seconds, sufficient to allow the removed dust to settle into the hopper, the nozzles of the adjacent blow pipe are simultaneously activated, then the nozzles of the next blow pipe etc. This cycle is continuously repeated so that about every five seconds or other suitable interval, the nozzles carried by one of the blow pipes are activated to back pulse the three filter elements disposed therebelow. With different configurations of filter assemblies, different back pulsing sequences would most likely be employed to achieve maximum cleaning efficiency. It has been found, however, that not more than one tenth of the total number of filter elements in the filter assembly should be back pulsed at one time.

Various changes and modifications may be made in carrying out the present invention without departing from the spirit and scope thereof. Insofar as these changes and modifications are within the purview of the appended claims they are to be considered as part of the present invention.

I claim:

1. A jet pump for use in a filter assembly for back pulsing a filter element to remove accumulated dust therefrom, said pump comprising a nozzle, means for communicating said nozzle with a source of pressurized fluid, and a hollow tube having a constant radius portion, the length of said constant radius portion being three to four times the diameter thereof, a first bell-mouth opening at one end thereof and a second bell-mouth opening at the other end thereof, the radius defining said first bell-mouth opening being about 0.3 times the diameter of said constant radius portion of said tube.

2. The jet pump of claim 1 wherein the radius of said second bell-mouth opening is about 0.3 times the diamater of said constant radius portion of said tube.

3. The jet pump of claim 1 wherein the length of said tube is about three to four times the diameter of said constant radius portion thereof.

4. The jet pump of claim 1 wherein the length of said tube is 3.5 to 4 times the diameter of the constant radius portion thereof.

5. In an air filter assembly having an upper clean air outlet chamber separated from a lower dirty air chamber by a partition having a plurality of apertures therein, a corresponding plurality of filter elements mounted in said lower dirty air chamber about said apertures and a corresponding plurality of pressurized air nozzles for directing back pulses of air through said filter elements for removing the dust therefrom, an improvement comprising: an ejector tube mounted over each of said apertures and below each of said air nozzles for directing air flow from the lower air chamber to the upper air chamber and for directing pulses of air from each of said nozzles through each of said filter elements and entraining air disposed about the upper end of said tube into said filter element, said tube having a constant radius portion extending substantially the length thereof, the length of said constant radius portion being three to four times the diameter thereof, a bell-mouth opening at the upper end of said constant radius portion and a bell-mouth opening at the lower end of said constant radius portion, the radius of said bell-mouth opening at the upper end of said tube being about 0.3 times the diameter of said constant radius portion of said tube.

6. The assembly of claim 5 wherein the radius of the bell-mouth opening at the upper end of said tube is substantially the same as the radius of the bell-mouth opening at the lower end of said tube.

7. A jet pump for use in a filter assembly for back pulsing a filter element to remove accumulated dust therefrom, said pump comprising a nozzle, means for communicating said nozzle with a source of pressurized fluid, and a hollow tube having a constant radius portion, said tube being disposed below said nozzle a distance equal to about 1.5 times the diameter of said constant radius portion, the length of said constant radius portion being three to four times the diameter thereof and said tube having bell-mouth openings at the ends thereof.

8. The jet pump of claim 7 wherein the radii of said bell-mouth openings are about 0.3 times the diameter of said constant radius portion of said tube.

* * * * *